United States Patent [19]

Blomberg et al.

[11] 4,170,066
[45] Oct. 9, 1979

[54] BRAKING APPARATUS AND METHOD WITH BOOSTER AND SPOILER

[76] Inventors: Folke I. Blomberg, Duvstigen 4, S-181 40 Lidingo; Jan-Olov M. Holst, Skogsduvevagen 14, S-75252 Uppsala, both of Sweden

[21] Appl. No.: 934,071

[22] Filed: Aug. 16, 1978

Related U.S. Application Data

[63] Continuation of Ser. No. 795,540, May 10, 1977, abandoned.

[51] Int. Cl.$^2$ .......................... B60T 8/00; B60T 13/68; B60T 13/72
[52] U.S. Cl. .................................... 303/114; 303/115; 303/116; 303/119
[58] Field of Search ............... 303/114, 115, 116, 119; 188/181 A

[56] References Cited

U.S. PATENT DOCUMENTS

| | | | |
|---|---|---|---|
| 3,578,820 | 5/1971 | Riordan | 303/114 |
| 3,847,449 | 11/1974 | Adahan | 303/116 |
| 3,877,756 | 4/1975 | Inada | 303/114 |

Primary Examiner—Reinhard J. Eisenzopf
Attorney, Agent, or Firm—Bell, Seltzer, Park & Gibson

[57] ABSTRACT

In a braking arrangement for a rotating member such as an automotive vehicle wheel and which has a fluid pressure actuated brake for slowing the rotating member together with a booster for increasing the fluid pressure imposed on the brake to a pressure higher than the pressure imposed by an operator, a sensor for signalling the occurrence of an excessive rate of retardation of the braked rotating member and a booster spoiler operatively connected with the booster and the sensor and responsive to a signalled occurrence of an excessive rate of retardation for decreasing the increased fluid pressure imposed by the booster. The booster may be either pneumatic or hydraulic, with corresponding variations in the specific form for the booster spoiler.

9 Claims, 6 Drawing Figures

BRAKING APPARATUS AND METHOD WITH BOOSTER AND SPOILER

This application is a continuation from parent application Ser. No. 795,540 filed May 10, 1977 and now abandoned.

A great deal of work has recently been devoted to brakes for rotating members capable of slowing rotation of a braked member at an optimum rate. Much of this work has arisen out of the automotive vehicle field, where it is desirable that a passenger car or truck be brought to a stop within the shortest possible distance while retaining directional stability and control. In efforts to obtain the shortest possible braking distances, provision has been made for increasing the braking force above that available simply from the muscular strength of a vehicle operator or driver. Such power assisted braking systems have received wide acceptance and are in general use.

While power brakes have dramatically decreased stopping distances, such brakes have introduced difficulty with maintaining directional stability and control. In the hands of an inexperienced operator or driver, an automotive vehicle equipped with power brakes can present a significantly greater danger of skidding and the like. At least partially for this reason, effort has been devoted recently to the development of anti-lock brake modulators, which controllably interrupt and release the application of fluid pressure to a brake. While such anti-lock modulators have achieved some success and promise the achievement of desirable goals for braking efficiency, the use of such modulators with power brakes exposes the modulators to relatively high fluid pressures with consequent high rates of wear and strict design requirements.

In light of these circumstances, it has now been determined that anti-lock control in conjunction with power assisted brake systems may be achieved or at least facilitated by use of a booster spoiler effective for removing the booster effect otherwise supplied to the braking system. Accordingly it is an object of the present invention to facilitate avoidance of wheel locking and skidding otherwise resulting from excessive braking efforts, by diminishing the effect of increased brake pressure achieved through use of power assisted brakes. Expressed differently, the present invention "spoils" the effect of increased fluid pressure imposed by means of the "booster" of a power brake system. In realizing this object of the present invention, provision is made for adaptation to power brake systems in which booster effects are achieved by imposition of air pressure differentials across a diaphragm and those in which hydraulic fluid pressure differentials are imposed across the system.

Yet a further object of this invention is to accomplish a reduction in braking effect in response to signalled occurrences of an excessive rate of retardation of a braked rotating member such as a vehicle wheel, with or without the use of a brake modulator. In realizing this object of the present invention, the diminution of braking effect accomplished by spoiling a booster effect has been found to be effective in reducing and in some instances removing a tendency for wheel locking and skidding of a vehicle.

Yet a further object of this invention is to coordinate the operation of a brake modulator and a booster spoiler in such a way as to facilitate reduction in wear of brake modulators and more universal applicability thereof the braking systems of varying pressure and volume capabilities. In realizing this object of the present invention, the increase in fluid pressure accomplished by the power assist booster of a braking system is "spoiled" or reduced during the operation of an associated modulator.

Some of the objects of the invention having been stated, other objects will appear as the description proceeds, when taken in connection with the accompanying drawing, in which FIG. 1 is a partly schematic, partly sectional view of a braking arrangement in accordance with present invention and particularly adapted for a pneumatic vacuum booster;

While this invention will be described hereinafter with particular reference to the accompanying drawings, in which illustrative embodiments of the present invention are set forth, it is to be understood at the outset of the description which follows that it is contemplated that persons skilled in the applicable arts may modify the specific details to be described while continuing to use the significant and novel characteristics of this invention. Accordingly, the description is to be understood to be directed to persons skilled in the applicable arts as a broad teaching of this invention.

Figure 1:
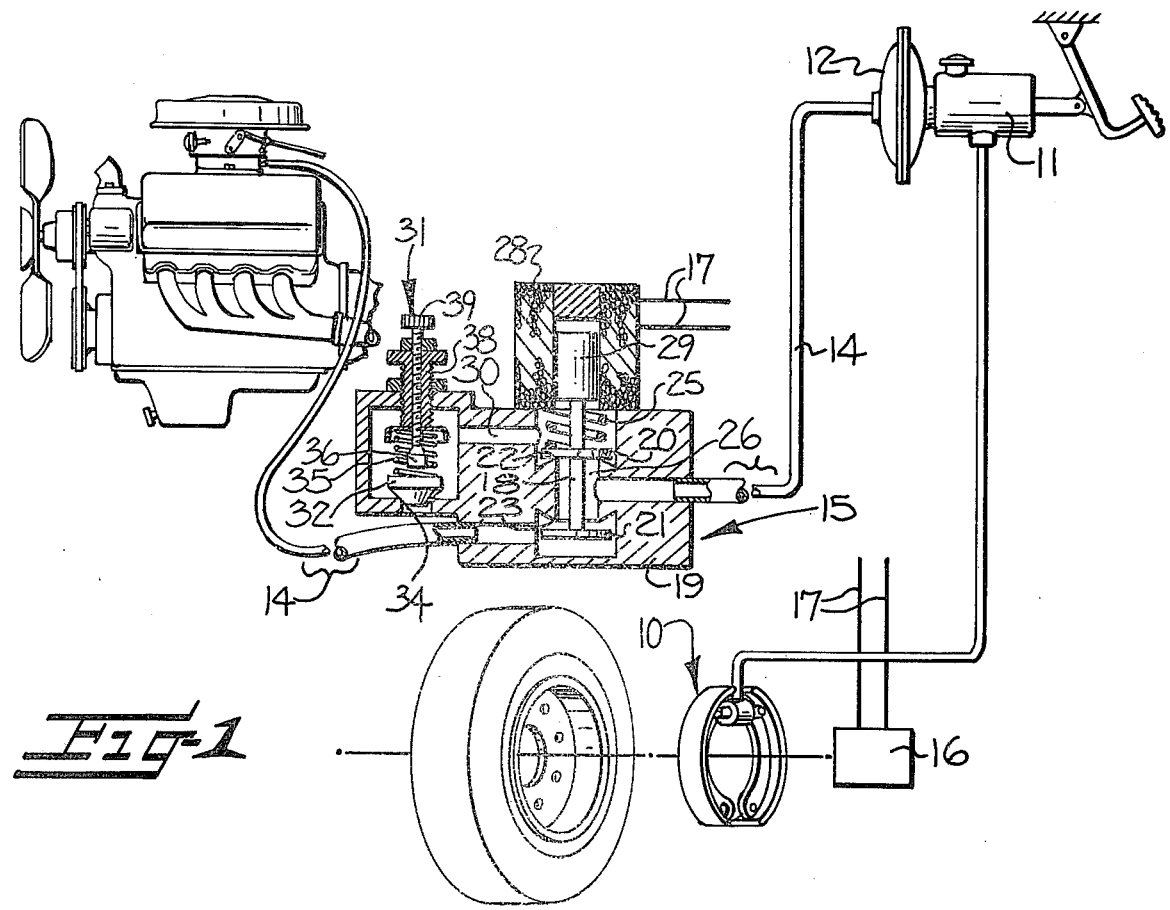

Referring now more particularly to the accompanying drawings, a braking arrangement for a rotating member in accordance with the present invention typically is installed in an automotive vehicle. Such an automotive vehicle (not shown) typically is equipped with fluid pressure actuated brake means for slowing a rotating member such as a vehicle wheel. Operator actuated means, typically in the form of a hydraulic fluid master cylinder generally indicated at 11, are provided for imposing fluid pressure on the brake means. The master cylinder 11 has operatively connected therewith a booster means for increasing the fluid pressure imposed on the brake means 10 to a pressure higher than the pressure imposed by the operator actuated master cylinder. In the specific form of FIG. 1, the booster means takes the form of a vacuum actuated diaphragm means generally indicated at 12. The booster means 12 is operatively connected with the master cylinder 11 and is responsive thereto for exertion of a fluid pressure differential across a diaphragm. Such vacuum actuated boosters for power brake systems are generally well-known to persons skilled in the arts of designing brakes for automotive vehicles, and, accordingly, will not here be described in detail. Interested readers seeking greater knowledge of such technology are referred to previously granted patents directed to such arrangements.

By means of a conduit generally indicated at 14 and extending between the diaphragm means 12 and an appropriate source of vacuum, such as the inlet manifold of an internal combustion engine, provision is made for controllably subjecting the diaphragm means 12 to a fluid pressure differential thereacross, in a manner generally known to appropriately skilled persons. While this description has been particularly directed to a brake arrangement wherein a differential pressure means comprises vacuum means for subjecting the diaphragm means 12 to a differential between atmospheric pressure and a pressure less than atmospheric, it is also known to persons skilled in the applicable arts to employ a differential pressure means which comprises a compressed air means for subjecting a diaphragm means to a differential between atmospheric pressure and a pressure greater than atmospheric. While this invention will be described hereinafter first with reference to a vacuum actuated diaphragm means 12, it is intended that this invention have applicability to all such variations and forms of power brakes.

In accordance with the present invention, a booster spoiler means generally indicated at 15 is interposed in the conduit 14 by which pressure fluid differentials are applied to the diaphragm means 12. The booster spoiler means 15 is thus operatively connected with the booster means for decreasing the fluid pressure differential imposed by the booster means as appropriate and as described more fully hereinafter.

The braking arrangement in accordance with the present invention additionally includes sensor means generally indicated at 16 for signalling the occurrence of an excessive rate of retardation of the braked rotating vehicle wheel member. Preferably, the sensor means includes electrical switch means for electrically signalling occurrences of an excessive rate of retardation by emitting a signal on appropriate conductors 17. Sensor means such as are indicated generally at 16 in the present drawings, for electrically signalling the occurrence of an excessive rate of retardation of a braked rotating member such as an automotive vehicle wheel, are known to persons skilled in the appropriate arts and, for that reason, no full disclosure has been given. Interested readers seeking disclosure of such sensors are referred to Holst U.S. Pat. No. 3,833,097, where a variety of such sensors are shown and described with reference to FIGS. 6-11 of that patent, and to co-pending Blomberg U.S. application Ser. No. 657,104 filed Feb. 11, 1976, now U.S. Pat. No. 4,061,212 issued Dec. 6, 1977. The sensors there shown or others know to skilled persons may be used in the arrangement of the present invention. Certain such sensors will be understood as signalling occurrences of wheel slip and are, for purposes of this description, deemed comparable to sensors signalling excessive rates of retardation.

The booster spoiler means of the present invention incorporates valve means operatively connected with the fluid pressure differential means provided by the diaphragm means 12 and responsive to the sensor means 16 for at least relieving the fluid pressure differential exerted by the differential means. In the form illustrated in FIG. 1, which is suitable for vacuum actuated diaphragms of relatively small size such as are found on lightweight passenger automobiles, the valve means comprises a valve spool or spindle 18 mounted within a housing 19 for movement relative thereto. The spindle 18 has mounted thereon a pair of valve discs 20, 21, each of which cooperates with a corresponding valve seat 22, 23. The valve provided by one disc 21 and its cooperating seat 23 is interposed directly in the conduit 14 and controls communication therethrough, while the valve formed by the other disc 20 and its cooperating seat 22 controllably opens communication between the diaphragm means 12 and the atmosphere, thus controllably venting the booster. The discs 20, 21 are coupled together by the spindle 18, in such a way that seating of one disc requires that the other disc be unseated. A biasing spring 25 normally urges the other disc 20 into seating engagement with its corresponding seat 22, sealing against venting of the diaphragm means 12 and permitting normal booster operation in which communication through the conduit 14 is established by means of a central passageway 26 within the housing 19.

The position of the spindle 18 is additionally controlled by a solenoid including a winding 28 and a cooperating core or armature 29. The winding 28 is electrically connected with the conductors 17 of the sensor means 16, for responding to an electrical signal indicative of an occurrence of an excessive rate of retardation of a braked wheel by shifting the spindle 18 and discs 20, 21 against the force of the spring 25. As so shifted, the normally unseated disc 21 is sealingly engaged with its corresponding seat 23, while the normally seated disc 20 is displaced from its corresponding seat 22. Thus, the diaphragm means 12 is vented to the atmosphere through the central passageway 26 and a vent passageway 30 extending through the housing 19.

In order to control the rate of diminishment of the booster effect and to prevent accidental entry into the housing 19 of foreign matter, a controlled check valve generally indicated at 31 is interposed between the atmosphere and the vent passageway 30. The check valve 31 includes a valve member 32 movable relative to an inlet passageway 34 against the bias of a regulating spring 35 and to an extent determined by a stop member 36. Threaded adjustment members 38, 39 are provided for the spring 35 and stop member 36 respectively, in order to permit regulation of both the rate of venting of the diaphragm means 12 and the vented pressure permitted in the diaphragm means. By regulation of the force exerted by the spring 35 and the extent to which the vent passageway is opened by positioning of the stop member 36, the rate and degree of diminishment of braking effort achieved in accordance with the present invention may be controlled.

Figure 2:
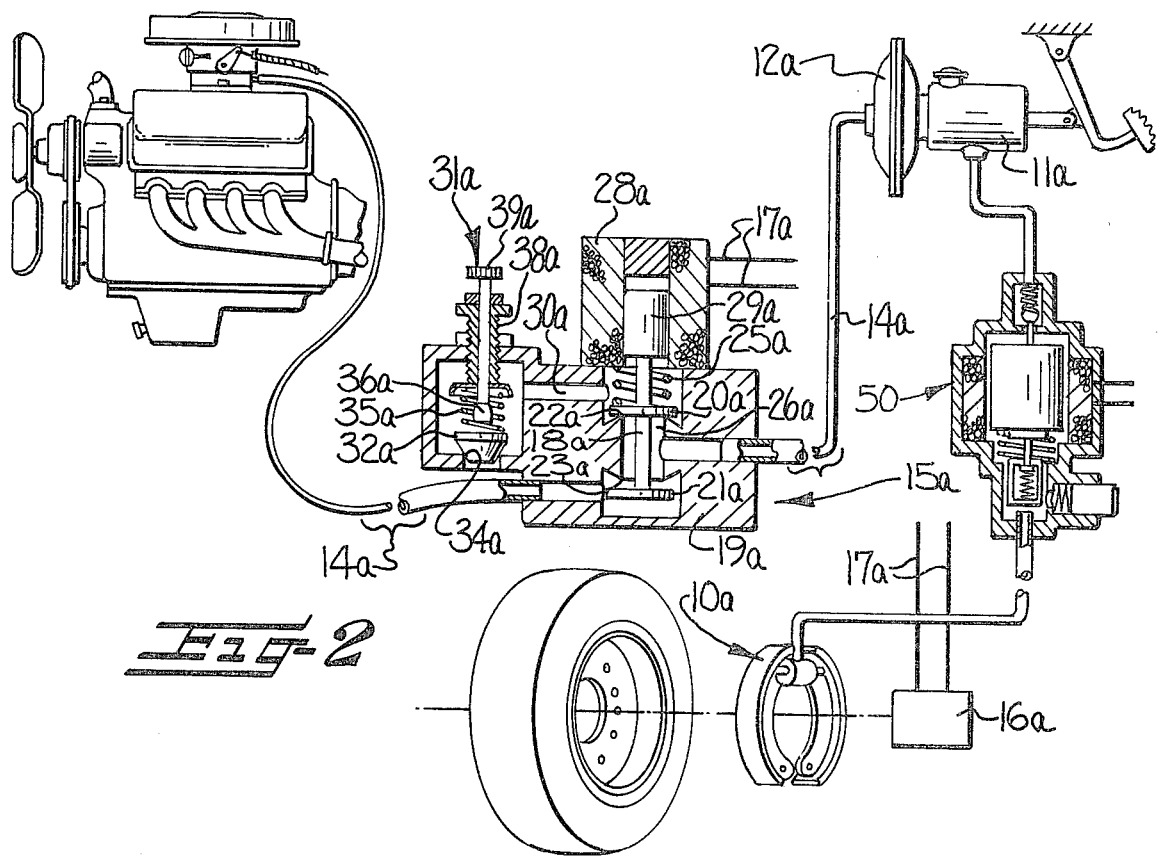
FIG. 2 is a view similar to FIG. 1, showing a braking arrangement incorporating one form of modulator.

An embodiment of the braking arrangement of this invention which incorporates a modulator is shown in FIG. 2, where one specific form of modulator is indicated generally at 50. As shown, the modulator is of a type described and claimed in co-pending Blomberg and Holst application Ser. No. 657,762 filed Feb. 13, 1976, now U.S. Pat. No. 4,068,904 issued Jan. 17, 1978. The structure of the modulator 50 and its function will be made more clear from that description, which is hereby incorporated by reference to any extent necessary to understanding of this invention, but persons skilled in the appropriate arts will know of other forms of modulators and understand their use in arrangements according to this invention. Elements of the arrangement according to FIG. 2 corresponding to elements of the arrangement of FIG. 1 have been identified by similar reference characters with the addition of the letter a, and will not be here described.

It will be noted that the modulator 50 operates in response to a sensor 16a signal, as does the booster spoiler 15a. Most conveniently, energization of the modulator 50 and booster spoiler 15a may occur simultaneously, but it is contemplated that variations in sensor construction and/or electrical circuitry may permit energization of the modulator 50 and booster spoiler 15a at any predetermined time relative to one another and to sensing of an excessive rate of wheel retardation.

Figure 3:
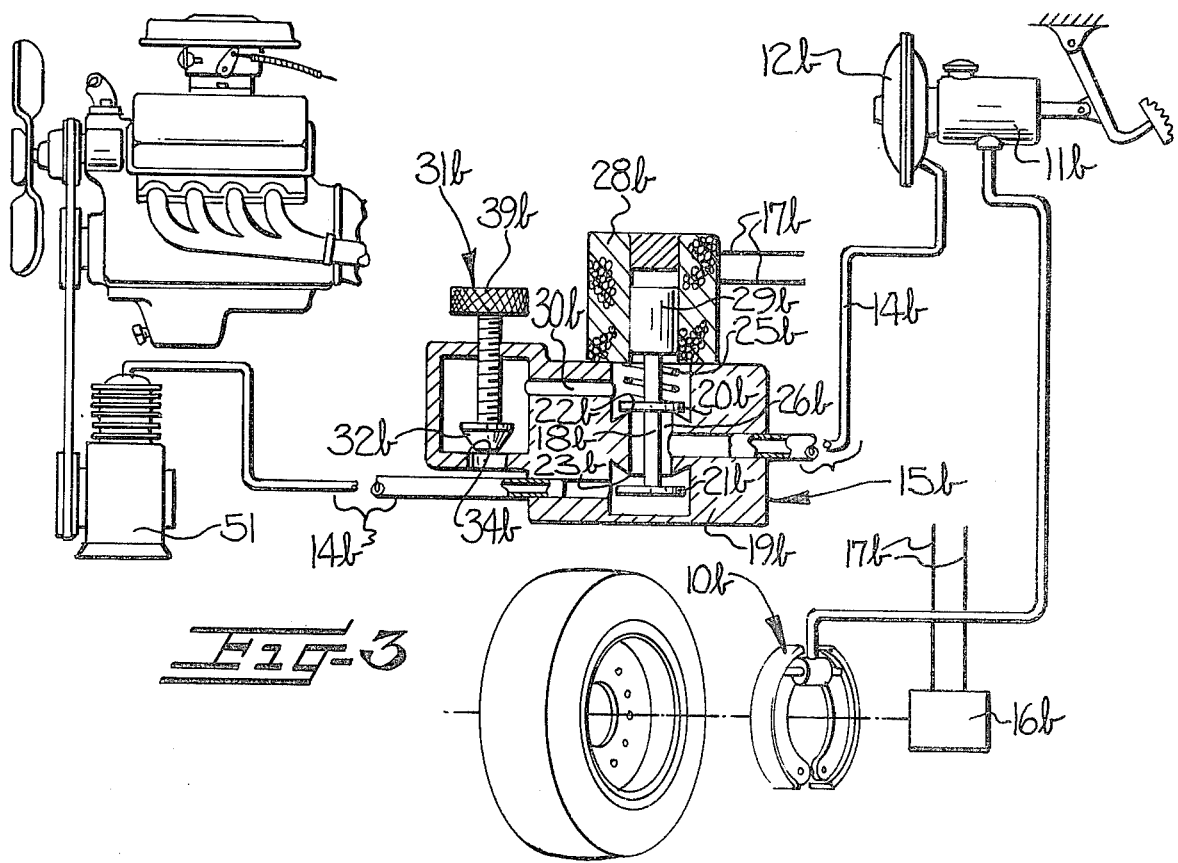
FIG. 3 is a view similar to FIG. 1, showing a braking arrangement incorporating a pneumatic compressed air booster.

FIG. 3 illustrates an embodiment of a braking arrangement of this invention wherein a booster 12b of pneumatic compressed air type is supplied from an engine driven compressor indicated generally at 51. Elements of FIG. 3 corresponding to elements shown in FIGS. 1 and 2 have been identified by similar reference characters followed by the letter b and the description of those elements will not be here repeated.

Figure 4:
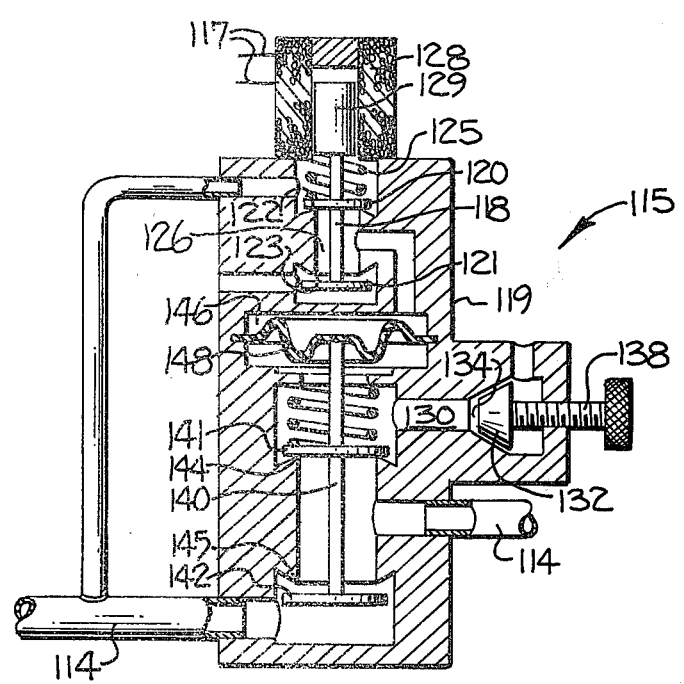
FIG. 4 is a sectional view similar to a portion of FIG. 1 illustrating a booster spoiler device with auxiliary servo assistance for accommodating larger air flow volumes.

A modified form of the booster spoiler 15 of the present invention which is usable with pneumatic boosters having larger areas is illustrated in FIG. 4, where components corresponding to components described above with reference to FIG. 1 are identified by like reference characters of a one hundred order series. The distinction between the booster spoiler 15 of FIG. 1 and the booster spoiler 115 of FIG. 4 is that the solenoid formed by the winding 128 and armature 129 controls a pilot valve spindle 118 which operates a servo valve including a spindle 140 which carries discs 141, 142 for cooperating with respective seats 44, 145. The servo valve is operated by the same vacuum source which supplies the vacuum boost for the vehicle brake system. The operation of the servo controlled booster spoiler 115 is substantially similar to the operation of the direct solenoid actuated booster spoiler 15 described hereinabove and it is accordingly deemed not necessary to repeat that description in full.

As will be appreciated, energization of the winding 128 causes the armature 129 to shift against the action of the return spring 125, moving the spindle 118 within the housing 119 so as to change the seating of the discs 120, 121 against their respective seats 122, 123. The central passageway 126 will thus be sealed from its normal communication with the atmosphere and the reduced pressure present in the conduit 114 will be admitted to a space 146 in which it may act against a membrane or diaphragm 148 which has its other surface exposed to atmospheric pressure. A pressure differential across the membrane or diaphragm 148 will shift the servo spindle 140 thereby changing the seating of the discs 141, 142 carried thereby with respect to their corresponding seats 144, 145. With such shifting of seating of the servo valve discs, that portion of the conduit 114 leading to the booster diaphragm means (not shown) is vented to the atmosphere.

In the form illustrated in FIG. 4, a valve member 132 is mounted on an adjustable member 138 for controllable positioning relative to an inlet passageway 134. As will be appreciated, adjustment of position of the valve member 132 relative to the inlet passageway 134 will vary the rate at which the increase in braking force obtained through use of the booster is diminished by operation of the booster spoiler 115.

Figure 5:
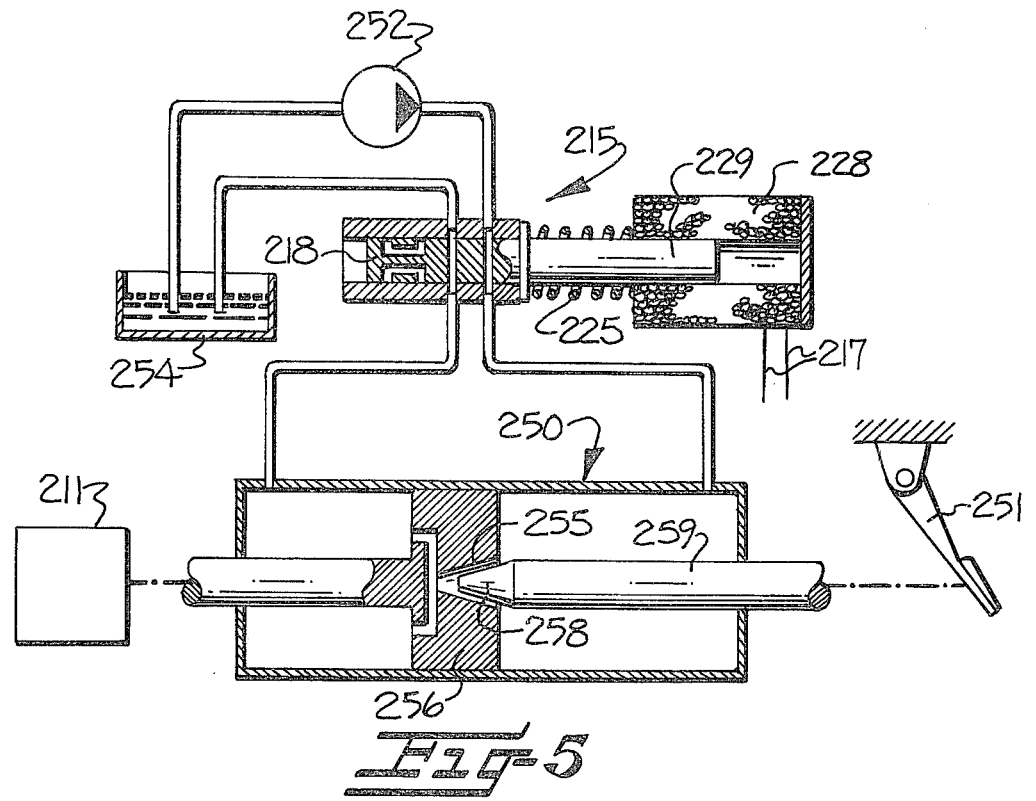
FIG. 5 is a view somewhat similar to FIG. 1, illustrating the application of the present invention to a hydraulic booster braking arrangement.
Figure 6:
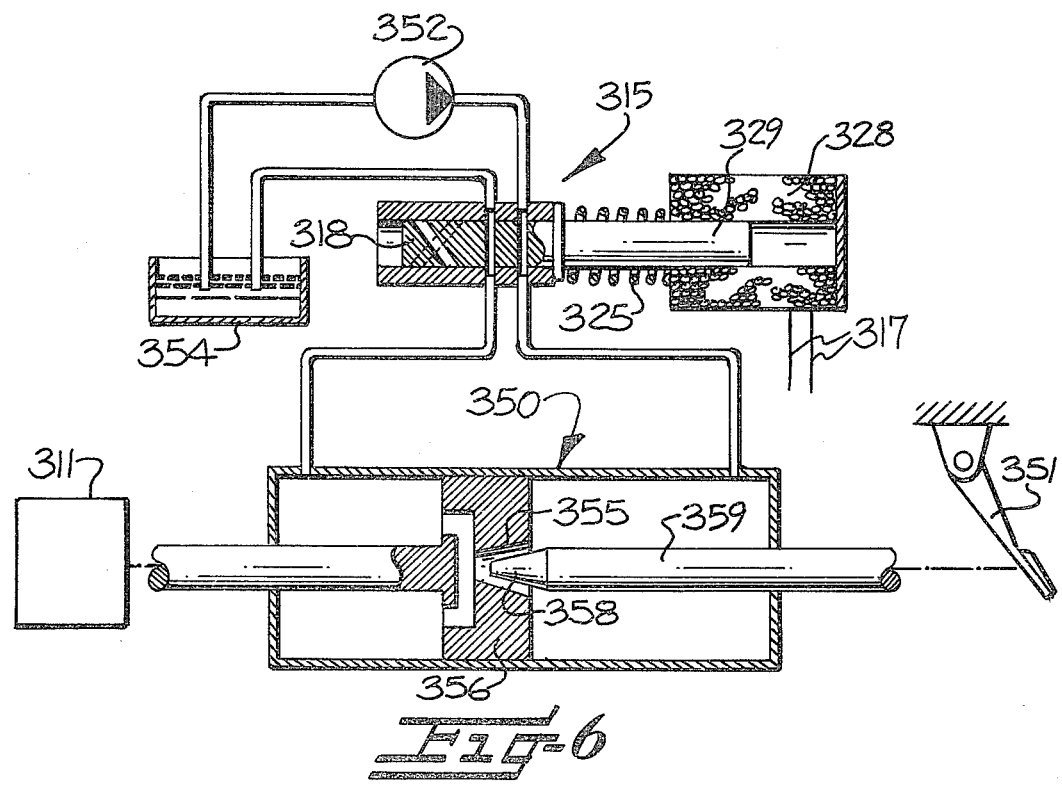
FIG. 6 is a view similar to a portion of FIG. 5, illustrating a modified form of the braking arrangement of that Figure.

Turning now more particularly to the application of the present invention to a power brake system in which the booster effect is obtained by use of a hydraulic fluid circulating system, FIGS. 5 and 6 of the drawings of this application illustrate two approaches to such systems. In each instance, components of the systems of FIGS. 5 and 6 functionally corresponding to components illustrated in FIG. 1 have been identified with common reference characters, of a two hundred order and three hundred order series, respectively. In each instance, a booster cylinder means respectively generally indicated at 250, 350 is interposed between a master cylinder 211, 311 and linkage means for actuation of the master cylinder by an operator, illustrated in the form of a brake pedal 251, 351.

Referring now more particularly to FIG. 5, a pump 252 withdraws suitable hydraulic fluid from a reservoir 254 and delivers hydraulic fluid to the booster cylinder means 250. A flow path is maintained through a passageway 255 in a piston 256 forming a portion of and movable within the booster cylinder means 250, so that fluid pumped from the reservoir 254 by the pump 252 may be returned thereto. By means of a truncated conical tip 258 formed on a brake rod 259 coupled to the pedal 251, flow of fluid through the passage 255 is restricted upon an operator applying pressure to the pedal 251, thereby leading to a booster assistance effect obtained by the force of hydraulic pressure delivered by the pump 252 acting against the area of the piston 256.

In accordance with the present invention, the booster spoiler means 215 for the hydraulic fluid power brake system of FIG. 5 takes the form of a controllable valve means interposed between the hydraulic fluid circulating means and the booster cylinder means 250 for diverting fluid pressure forces otherwise imposed by the hydraulic fluid circulating means. More specifically, the booster spoiler 215 of FIG. 5 has a valve spindle or spool 218 normally maintained in a first position by the action of a spring 225. In such position, passageways permitting normal hydraulic fluid flow from the pump 252 and back to the reservoir 254 open the necessary operative communication. Upon energization of a winding 228 and shifting movement of an armature 229, the valve spingle or spool 218 is shifted to provide return flow passages by which the flow of hydraulic fluid induced by the pump 252 is returned directly to the reservoir 254. At the same time, the hydraulic fluid pressure differential appearing across the booster cylinder means piston 256 is equalized or levelled and the booster effect is spoiled and will cease. Persons familiar with such hydraulically assisted power brake systems will be able to apply such a return valve means in systems of the type known and illustrated in prior patents.

In distinction from the arrangement of FIG. 5, the arrangement of FIG. 6 provides a reversing valve means in the booster spoiler means 315. As will be noted, the passageways in the spindle or spool 318 provide a cross-flow path by which the differential of hydraulic fluid pressure forces imposed across the piston 256 is reversed. In this case, the booster effect will not only be canceled during activation of the system but the pump 352 will assist in generating an opposite force acting against the force applied to the brake pedal by an operator when the wheel retardation sensor has signalled that wheel locking is imminent.

Persons skilled in the applicable arts will appreciate that controlled flow devices capable of accomplishing rate and extent of diminution or reversal of booster effect can be applied to the hydraulic fluid pressure power brake systems of FIGS. 5 and 6 just as they were applied to the pneumatic power brake systems of FIGS. 1 through 4.

Similarly, persons skilled in the applicable arts of designing brake control systems for automotive vehicles will appreciate a variety of approaches which may be used to apply the present invention. In perhaps the simplest form, a single brake master cylinder having a single booster and booster spoiler may respond to a single sensor means operatively connected with one or more vehicle wheels. Somewhat more sophisticated systems may employ plural boosters each with a corresponding booster spoiler and with each booster spoiler under the control of one or more sensors. By such arrangements, sensors may be provided for individual non-driven wheels and for paired driven wheels. Further, sensors may be provided for individual driven wheels, with the sensors being paired for control of a booster spoiler for the corresponding wheels. Other and further permutations of such arrangements will be brought to mind by these brief comments, such as arrangements in which all wheels are provided with wheel retardation sensors, the front and rear axles each having a booster spoiler device. Yet another arrangement might provide an individual retardation sensor and booster spoiler device for each of the rear wheels while the front wheels have a common wheel retardation sensor and booster spoiler. Finally, each wheel may have its own wheel retardation sensor and its own booster spoiler device. As will be recognized by skilled persons, the use of brake modulators may be similarly permutated in that one modulator may be provided for an entire system, or one modulator may be provided for each wheel, or sharing arrangements of various forms may be used. This invention is contemplated as being useful with all such arrangements.

In the drawings and specifications, there has been set forth a preferred embodiment of the invention, and although specific terms are employed, they are used in a generic and descriptive sense only and not for purposes of limitation.

That which is claimed is:

1. A braking arrangement for a rotating member comprising fluid pressure actuated brake means for slowing the rotating member, operator actuated means communicating with said brake means for imposing fluid pressure on said brake means, booster means operatively connected with said operator actuated means for increasing the fluid pressure imposed on said brake means to a pressure higher than the pressure imposed by said operator actuated means and comprising booster cylinder means and hydraulic fluid circulating means operatively communicating with said booster cylinder means for imposing fluid pressure forces thereon, sensor means for signalling the occurrence of an excessive rate of retardation of the braked rotating member, and booster spoiler means operatively connected with said booster means and said sensor means and responsive to a signalled occurrence of an excessive rate of retardation for decreasing the fluid pressure imposed by said booster means, said booster spoiler means comprising reversing valve means controllably interposed between said hydraulic fluid circulating means and said booster cylinder means for diverting fluid pressure forces otherwise imposed by said hydraulic fluid circulating means and for reversing the differential of fluid pressure forces imposed thereacross.

2. Apparatus according to claim 1 wherein said sensor means comprises electrical switch means for electrically signalling occurrence of an excessive rate of retardation and further wherein said booster spoiler means comprises solenoid actuated valve means electrically connected with and responsive to said switch means.

3. A braking arrangement for a rotating member comprising fluid pressure actuated brake means for slowing the rotating member, operator actuated means for imposing fluid pressure on said brake means and comprising brake rod means, booster cylinder means comprising piston means defining a passageway for cooperating with said brake rod means, and thereby operatively connected to said operator actuated means for increasing the fluid pressure imposed on said brake means to a pressure higher than the pressure imposed by said operator actuated means, hydraulic fluid circulating means operatively communicating with said booster cylinder means for imposing hydraulic pressure thereon and comprising reservoir means for containing hydraulic fluid and pump means for circulating hydraulic fluid from said reservoir means through said piston means whereby partial closure of said passageway by said brake rod gives rise to differentials in hydraulic fluid pressure across said piston means, sensor means for electrically signalling the occurrence of an excessive rate of retardation of the braked rotating member, and booster spoiler means operatively connected with said booster cylinder means and said sensor means and comprising solenoid controlled valve means responsive to a signalled occurrence of an excessive rate of retardation for diverting fluid pressure forces otherwise imposed by said circulating means.

4. Apparatus according to claim 3 wherein said controlled valve means comprises return valve means operatively communicating with said pump means and said reservoir means and controllably interposable between said pump means and said booster cylinder means for providing a flow path recirculating hydraulic fluid from said pump to said reservoir means.

5. Apparatus according to claim 3 wherein said controlled valve means comprises reversing valve means operatively communicating with said pump means and said reservoir means and controllably interposable between said pump means and said booster cylinder means for reversing the direction of flow of fluid from said reservoir means through said piston means.

6. A braking arrangement for a rotating member comprising fluid pressure actuated brake means for slowing the rotating member, operator actuated means communicating with said brake means for imposing fluid pressure on said brake means, booster means operatively connected with said operator actuated means for increasing the fluid pressure imposed on said brake means to a pressure higher than the pressure imposed by said operator actuated means and having diaphragm means controllably subjected to a differential thereacross between atmospheric pressure and a pressure less than atmospheric, sensor means operatively connected with the rotating member for signalling the occurrence of an excessive rate of retardation of the member, brake modulator means operatively connected with said brake means and said sensor means and responsive to signalling from said sensor means for decreasing and increasing the fluid pressure imposed on said brake means upon the occurrence of an excessive rate of retardation of the braked rotating member, and booster spoiler means operatively connected with said sensor means and said booster means and said modulator means and responsive to signalling from said sensor means for controllably subjecting said diaphragm means to atmospheric pressure on opposing sides thereof and thereby decreasing the fluid pressure imposed by said booster means during operation of said modulator means.

7. In a method of braking an automotive vehicle including supplying pressurized hydraulic fluid from an operator actuated device, controllably boosting the pressure of the hydraulic fluid to a pressure higher than the pressure supplied from the device by subjecting a diaphragm to a differential thereacross between atmospheric pressure and a pressure less than atmospheric, applying the pressurized hydraulic fluid to a wheel brake, sensing the occurrence of an excessive rate of retardation of the braked wheel and signalling such sensed occurrence, and modulating braking of the wheel in response to such signalling of a sensed occurrence, the improvement comprising controllably subjecting the diaphragm to atmospheric pressure on opposing sides thereof and thereby reducing the boost in the pressure of the hydraulic fluid in response to such signalling of a sensed occurrence and while the modulating of braking is occurring.

8. A method according to claim 7 wherein the step of reducing the boost comprises reducing the pressure of the hydraulic fluid to the pressure supplied from the device.

9. A method according to claim 7 wherein the step of reducing the boost comprises reducing the pressure of the hydraulic fluid to a pressure below the pressure otherwise supplied from the device.

* * * * *